J. ANDERSON & J. G. FLEMING.
TRACTOR.
APPLICATION FILED OCT. 19, 1916.
1,252,643.
Patented Jan. 8, 1918.
2 SHEETS—SHEET 1.
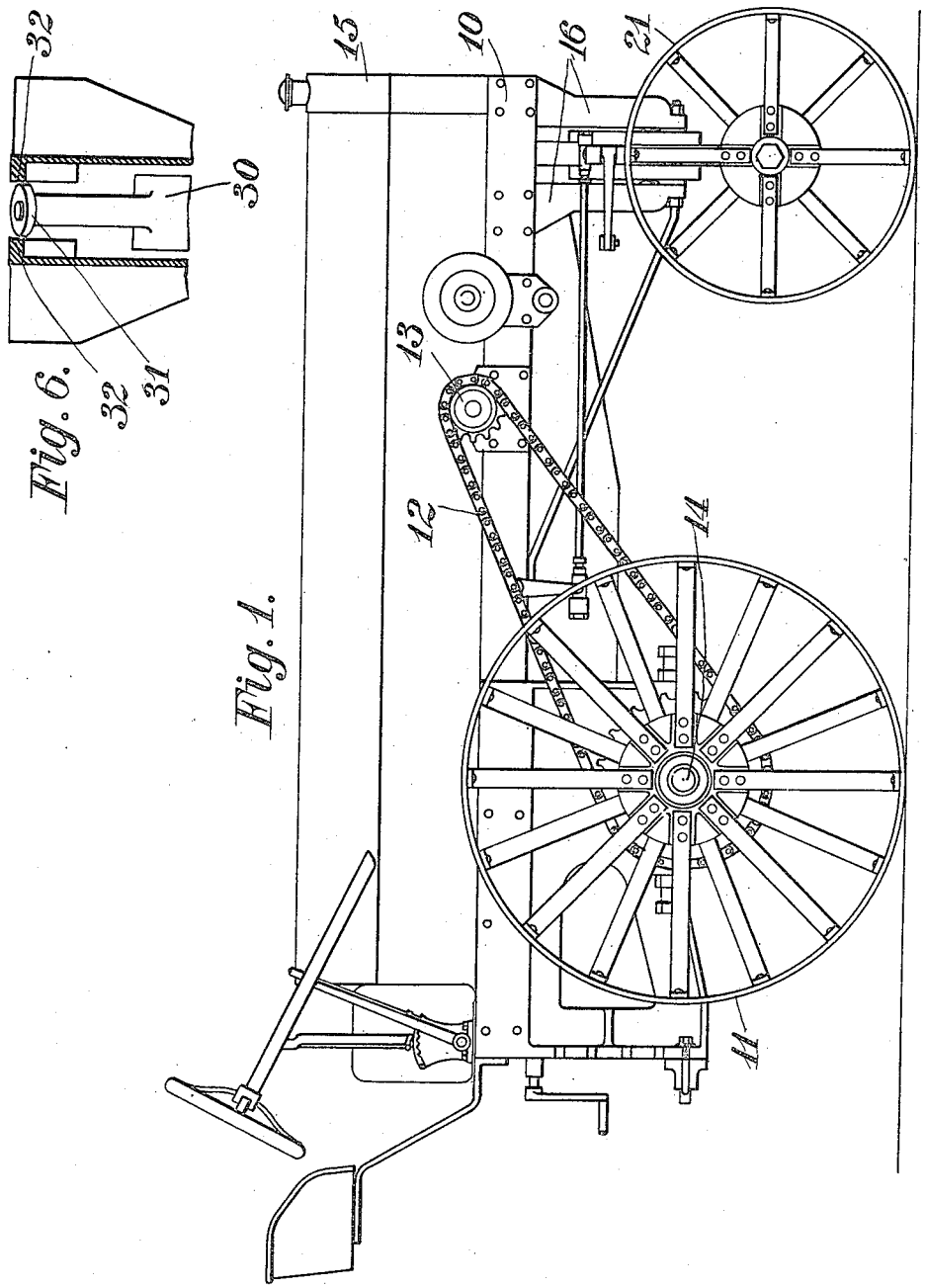
Inventor
James Anderson
John G. Fleming
By
Attorneys

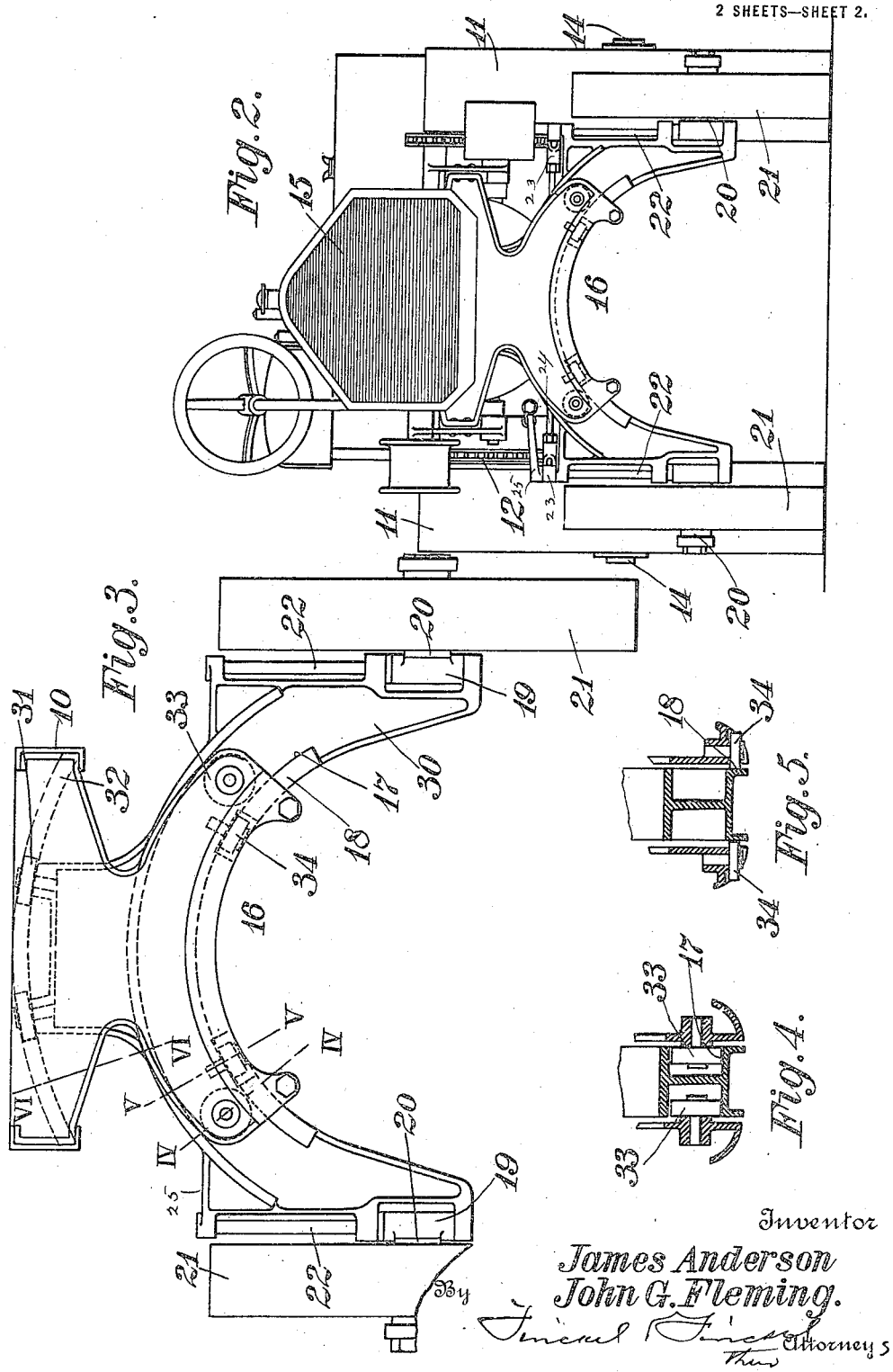

UNITED STATES PATENT OFFICE.

JAMES ANDERSON AND JOHN G. FLEMING, OF COLUMBUS, OHIO, ASSIGNORS OF FIFTY-ONE ONE-HUNDREDTHS TO HERMAN E. VANCE, OF FRANKLIN COUNTY, OHIO.

TRACTOR.

1,252,643. Specification of Letters Patent. Patented Jan. 8, 1918.

Application filed October 19, 1916. Serial No. 126,489.

*To all whom it may concern:*

Be it known that we, JAMES ANDERSON, a subject of the King of England, and JOHN G. FLEMING, a citizen of the United States, each residing at Columbus, in the county of Franklin and State of Ohio, have invented a certain new and useful Improvement in Tractors, of which the following is a specification.

This invention relates to tractors and particularly to such as are employed for the cultivation of fields of corn or other comparatively high growing plants that are planted in rows.

One of the objects of the invention is to provide an improved tractor that can straddle rows of corn or other plants after they have grown to substantial height. Another object of the invention is to provide an improved construction of tractor or other vehicle in which the chassis is relieved of much of the torsional strain when traveling over uneven ground.

The invention is embodied in the example herein particularly shown and described, the feature of novelty being claimed at the close of the description.

In the accompanying drawings—

Figure 1 is a view in side elevation of a tractor according to the invention.

Fig. 2 is an elevation of the front end of the tractor.

Fig. 3 is a detail view of the mounting for the front wheels.

Fig. 4 is a detail section on a line IV—IV Fig. 3.

Fig. 5 is a section on the line V—V Fig. 3.

Fig. 6 is a section on the line VI—VI, Fig. 3.

In the views 10 designates the chassis frame of the tractor. 11 designates the rear wheels, which are large and are driven by a sprocket chain 12 running over a pinion 13 operated by the engine. The rear wheels turn on stud axles 14 projecting from frames extending downward from the rear of the chassis frame so as to leave ample space between the wheels under the rear of the chassis and permit the tractor to pass over the plants without injury to them. The axles of the rear wheels are comparatively rigid with reference to the chassis.

Rigidly mounted between the sides of the chassis frame below the engine radiator 15 is a two-part frame 16 with a space between the parts, said frame being of arch form at its lower portion. In the construction shown the arched portion of this frame has bearings 17 and 18 on the arcs of circles having for their center a point on the line of the normal axis of the front wheels and midway between the wheels, but this arched portion may be formed on a different arc.

The front wheels are carried by an upwardly curved frame 30, the lower portion of which is an open arch curved like the lower portion of the two-part frame 16. In the lower portions of the arms of this arched frame 30 are members 19 having laterally projecting stud axles 20 to receive the front wheels which are designated 21. The members 19 are each swiveled in a suitable vertical bearing by means of an upwardly extending spindle 22 upon which are secured rocking spindle 22 connected by a rod 24. A steering arms 23 connected by a rod 24. A steering arm 25 is connected with one of the spindles 22 to be operated through suitable connections to allow for rocking with a steering wheel.

The axle or frame 30 has a projection that extends upward into the space between the members of the two-part frame 16, and upon said projection are roller bearings 31 that ride on tracks 32 on the frame 16, said tracks being on arcs concentric with the bearings in the lower portion of the frame 30. The chassis at its front portion is supported by vertically standing rollers 33 on the bearings 17 while horizontal thrust is borne by horizontal roller bearings 34 riding on the bearings 18.

From this construction it will be observed that the front wheels and their carrying axle or frame can be rocked with reference to the chassis so that if the tractor travels over uneven ground the front wheels change their position with reference to the chassis or the chassis changes its position with reference to the wheels according to whether it is the front wheels or the rear wheels that are traveling upon the uneven ground.

What we claim is—

1. In a vehicle having two pairs of wheels, the combination of an axle for one pair of said wheels, said axle being of upwardly curved open arch form and having an upward projection from its center and a two part spaced frame on the main frame of the vehicle, said spaced frame containing a supporting bearing for said axle formed on an upwardly curved arc having for its center an imaginary point in a line midway between the wheels of said pair of wheels, and said spaced frame also containing a bearing for the upwardly projecting portion of the axle.

2. In a vehicle having two pairs of wheels, the combination of an axle for one pair of said wheels, said axle being of upwardly curved open arch form and a supporting bearing on the frame of the vehicle for said axle formed on an upwardly curved arc having for its center an imaginary point in a line midway between the wheels of said pair of wheels and substantially in the line of the axis of said wheels.

3. In a vehicle having two pairs of wheels, the combination of an axle for one pair of said wheels, said axle being of upwardly curved open arch form and a supporting bearing on the frame of the vehicle for said axle formed on an upwardly curved arc having for its center an imaginary point in a line midway between the wheels of said pair of wheels, the other pair of said wheels being supported relatively stationarily with reference to said vehicle frame.

4. In a vehicle having front and rear wheels, the combination of an axle for a pair of said wheels, said axle being of upwardly curved open arch form and a supporting bearing on the frame of the vehicle for said axle formed on an upwardly curved arc having for its center an imaginary point in a line midway between the wheels of said pair of wheels, the other of said wheels being supported relatively stationary horizontally with reference to said vehicle frame.

JAMES ANDERSON.
J. G. FLEMING.

Copies of this patent may be obtained for five cents each, by addressing the "Commissioner of Patents, Washington, D. C."